United States Patent [19]

Frazier et al.

[11] 4,019,495
[45] Apr. 26, 1977

[54] CONTROL SYSTEM FOR SOLAR HEATER

[76] Inventors: Clive A. Frazier, 5325 Curry Ford Road A-203; Marion L. Cunningham, 3210 Wickersham Ct., both of Orlando, Fla. 32806

[22] Filed: Dec. 29, 1975

[21] Appl. No.: 644,928

[52] U.S. Cl. .............................. 126/271; 237/1 A; 165/78
[51] Int. Cl.² ......................................... C24J 3/02
[58] Field of Search .................. 126/270, 271, 400; 237/1 A; 165/18

[56] References Cited

UNITED STATES PATENTS

| | | | |
|---|---|---|---|
| 2,342,211 | 2/1944 | Newton | 126/271 |
| 2,469,496 | 5/1949 | Christenson | 237/1 A |
| 3,931,806 | 1/1976 | Hayes | 126/271 |
| 3,949,732 | 4/1976 | Reines | 126/270 |

*Primary Examiner*—Kenneth W. Sprague
*Assistant Examiner*—James C. Yeung
*Attorney, Agent, or Firm*—Duckworth, Hobby, Orman, Allen, & Pettis

[57] ABSTRACT

A system for controlling the flow of a liquid through a solar heating system of the type having the output of a solar energy collector coupled to the input of a storage tank and having a circulating pump interposed along a return liquid pipe coupled between the recirculating output of the storage tank and the input of the solar energy collector. A first element senses the temperature of the liquid adjacent to the output of the solar energy collector and generates a first signal responsive thereto. A second element senses the temperature of the liquid at a second location within the solar heating system and generates a second signal responsive thereto. A first comparator is coupled between the first and second elements for generating a run signal responsive to the difference between the first and second signals exceeding a predetermined level. The control system further includes an actuating element for powering the circulating pump responsive to the run signal, whereby the liquid is circulated within the solar heating system.

17 Claims, 2 Drawing Figures

CONTROL SYSTEM FOR SOLAR HEATER

BACKGROUND OF THE INVENTION

1. Field of the Invention

This invention relates to liquid heating systems operated with radiant solar energy and in particular to a control system using a differential amplifier for sensing temperature differentials within the system and controlling the circulation of the liquid responsive thereto.

2. Description of the Prior Art

Solar water heaters have long been known to be an efficient method for utilizing solar radiant energy to heat a liquid such as water for subsequent storage and use. However, the availability of inexpensive electricity and natural gas has heretofore made the solar water heater a second choice due to its high initial capital investment requirement. With the present rapidly increasing costs of conventional sources of power, such as electrical, gas or fossil fuels, the interests in solar water heating systems has been rekindled.

Heretofore the circulation of water within the solar water heating system has been controlled by such methods as a thermostat control, a solar cell control, a clock control or natural convection circulation. A typical thermostat control includes a thermostat mounted on the solar water heater. When the water reaches a predetermined temperature, such as 135° F., the thermostat actuates a control circuit which supplies power to a circulating pump. However, on cold, cloudy or rainy days the solar collector may not heat the water to the predetermined temperature and thus most of the solar energy collected within the solar collector will be lost since the heated water will remain in the solar collector. The typical solar cell control system includes a sun sensor mounted on the roof near the solar collector. When the sun is shining brightly the solar cell actuates circuitry to supply power to the circulating pump. At night or on cloudy days the circulating pump remains off. This solar cell system also wastes some of the solar energy collected on cloudy or overcast days because the solar cell will not be actuated and thus the hot water remains in the solar collector. Furthermore, it is possible for the solar cell sensing system to actually cool the water on days having cold outside temperatures and bright sunshine. This combination of unusual weather conditions is a serious problem in some northern latitudes. The typical clock control system includes a simple electric clock timer which supplies electrical power to the pump at predetermined times, usually turning the circulating pump on after sunrise and off before sunset. The clock control system is simple to design and inexpensive to construct, but on cold or overcast days the water within the solar collector may be cooled rather than heated since the thermal radiation may exceed the solar energy absorption.

A differential temperature sensing and control system avoids all of these previous system deficiencies by measuring the temperature of the water at two locations within the system and controlling the circulation of the water within the system responsive to the temperature differential therebetween. A first temperature sensor is located adjacent to the top. or the hottest section, of the solar collector. A second temperature sensor is mounted on the water storage tank adjacent to the cold water outlet, which is the coldest section thereof. A differential comparator compares the temperature differential between the water storage tank and the solar collector, and circulates the water from the solar collector into the storage tank when the temperature of the water in the solar collector exceeds the temperature of the water in the storage tank by a predetermined level. This differential control system maximizes the solar energy collected within the solar energy collector.

The concept of using a differential comparator for actuating climate control systems is disclosed by Carlson in U.S. Pat. Nos. 3,833,859 and 3,860,837. The Carlson device is merely a thermostat utilizing a differential comparator to sense the temperature differential between the calibration standard and an element which varies in resistance responsive to a change in temperature. Another differential amplifier system for controlling climatic heating and cooling systems is disclosed by Pinckaers in U.S. Pat. No. 3,535,561. The Pinckaers system uses a differential amplifier control system for supplying power to either a cooling system or a heating system responsive to the temperature within a living area.

SUMMARY OF THE INVENTION

A system for controlling the flow of a fluid through a solar heating system of the type having the output of a solar energy collector coupled to the input of a storage tank and having a circulating pump interposed along a return liquid pipe coupled between the recirculating output of the storage tank and the input of the solar energy collector. The control system includes first temperature means for sensing the temperature of the liquid adjacent to the output of the solar energy collector, with the first temperature means generating a first signal responsive thereto. Second temperature means is included for sensing the temperature of the liquid at a second location within the solar heating system, with the second temperature means generating a second signal responsive thereto. A first comparator means is coupled between the first and second temperature means for generating a run signal responsive to the difference between the first and second signals exceeding a predetermined level. Actuating means are included for powering the circulating pump responsive to the run signal, whereby the liquid is circulated within the solar heating system responsive to the temperature differential.

A freeze protection means may also be included in the control system for the solar heater. Third temperature means are included for sensing the temperature of the liquid in the solar energy collector, with the third temperature means generating a third signal responsive thereto. A reference standard is included for generating a reference signal. Second comparator means are coupled between the reference standard and the third temperature means for transmitting a run signal to the actuating means responsive to the difference between the third signal and the reference signal exceeding a predetermined tolerance level. In a first preferred embodiment of the present invention, the first and third temperature means comprise the same element.

THE DRAWINGS

DETAILED DESCRIPTION OF THE PREFERRED EMBODIMENT

Figure 1:
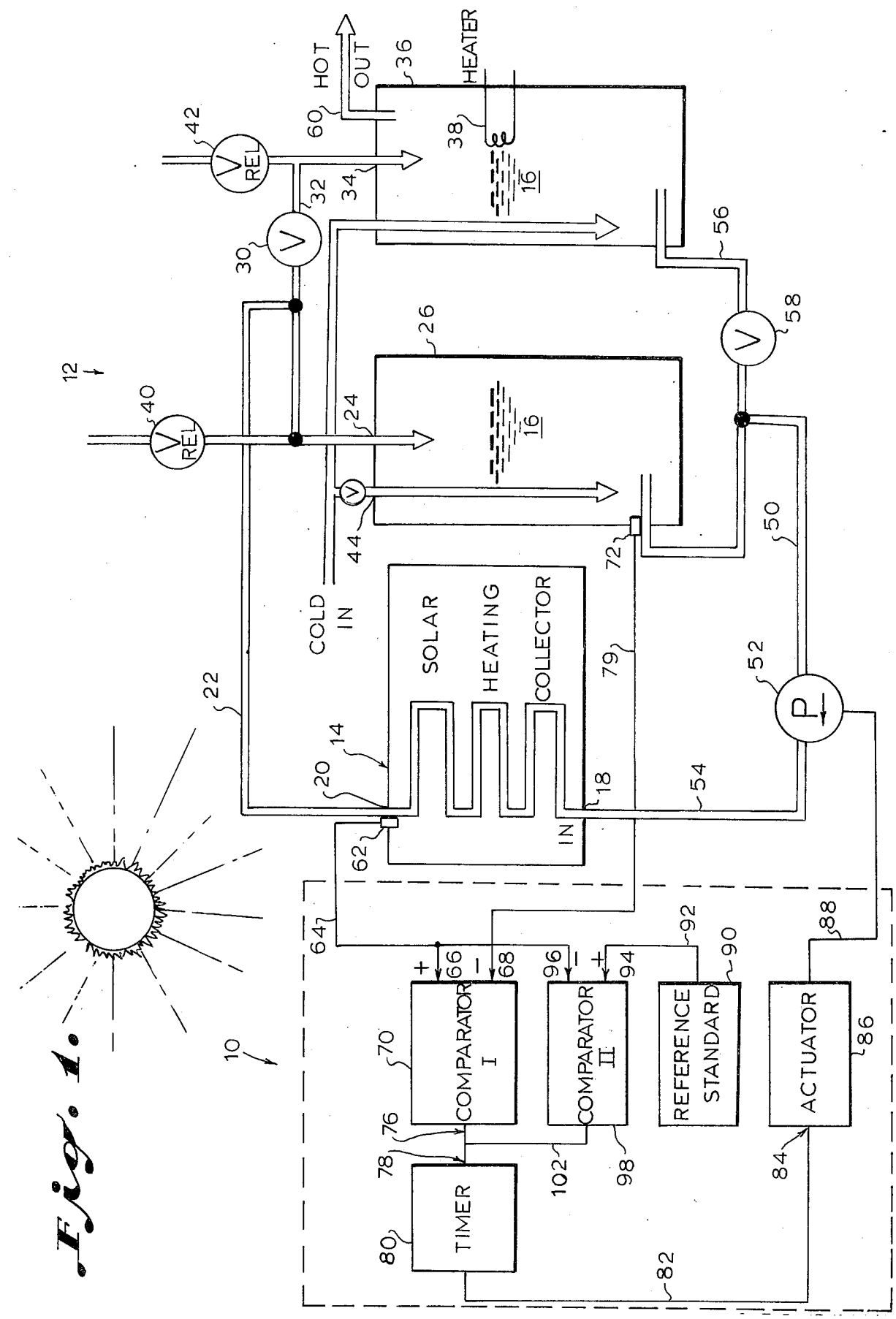
FIG. 1 is a block diagram showing the control system for the solar heater.

A control system, shown generally as 10 in FIG. 1, will now be described for a solar heater 12 of the type having a solar heating collector for heating a liquid 16 (such as water) therein. A typical solar heating collector 14 has a plurality of water passageways serpentined therethrough and is fabricated having a black surface facing the sun to maximize the absorption of solar radiation. The solar heating collector 14 has an input 18 thereto and an output 20 therefrom. The output 20 from the solar heating collector 14 is coupled by a hot water pipe 22 to an input 24 of a storage tank 26. A second hot water pipe 32 is coupled from the first hot water pipe 22 to the input 34 of a second storage tank 36 of the type having an auxiliary heating unit 38 coupled thereto. The second hot water pipe 32 includes a first auxiliary valve 30 therein for controlling the flow of the hot water 16 therethrough. The first storage tank 26 includes a first relief valve 40 coupled thereto and the second storage tank 36 includes a second relief valve 42 coupled thereto. The first storage tank 26 includes a cold water input 44.

The first storage tank 26 further includes a hot water return line 50 (liquid return line) which is coupled therethrough adjacent the bottom section thereof. The cool water return line 50 is coupled to the input of a circulating pump 52. The output of the circulating pump 52 is coupled by another cool water return line 54 to the input 18 of the solar heating collector 14. A second cool water return line 56 is coupled to the second storage tank 36 adjacent the bottom section thereof. A second auxiliary valve 58 is interposed along the second cool water return line 56. The second storage tank 36 further includes a main hot water output line 60 coupled adjacent the upper section thereof.

A first thermistor (or first temperature sensing means) 62 is attached to the solar heating collector 14 adjacent to the output 20 thereof for sensing the temperature of the water 16 flowing therefrom and for generating a first signal responsive thereto. The first thermistor 62 may be coupled to the output pipe 20 rather than through the heating collector 14. The first signal from the first thermistor 62 is coupled by a first signal line 64 to a plus input 66 of the first comparator 70. A second thermistor or second temperature sensing means 72 is coupled to the first storage tank 26 adjacent to the lower section thereof. This second location for the second thermistor 72 is normally located immediately adjacent to the cool water return line 50 or attached thereto. The second signal generated by the second thermistor 72 responsive to the temperature thereof is coupled by a second signal line 74 to a minus input 68 of the first comparator 70. The first comparator 70 generates a run signal whenever the first signal present at the plus input 68 is less than the second signal present at the minus input 66 by a predetermined level. The run signal is coupled from the output 76 of the first comparator 70 through a control line 78 to the input of a timer 80. The output of the timer 80 is coupled by another control line 82 to the input 84 of an actuating means or actuator 86. The output of the actuator 86 is coupled by another control line 88 to supply power to the circulating pump 52. A reference signal generated by a reference standard 90 is coupled through a reference signal line 92 to the plus input 94 of a second comparator (or second comparator means) 98. A minus input 96 of the second comparator 98 is coupled to the first thermistor 62 by the first signal line 64. The output of the second comparator is coupled to the input of the timer 80 by another signal line 102.

Figure 2:
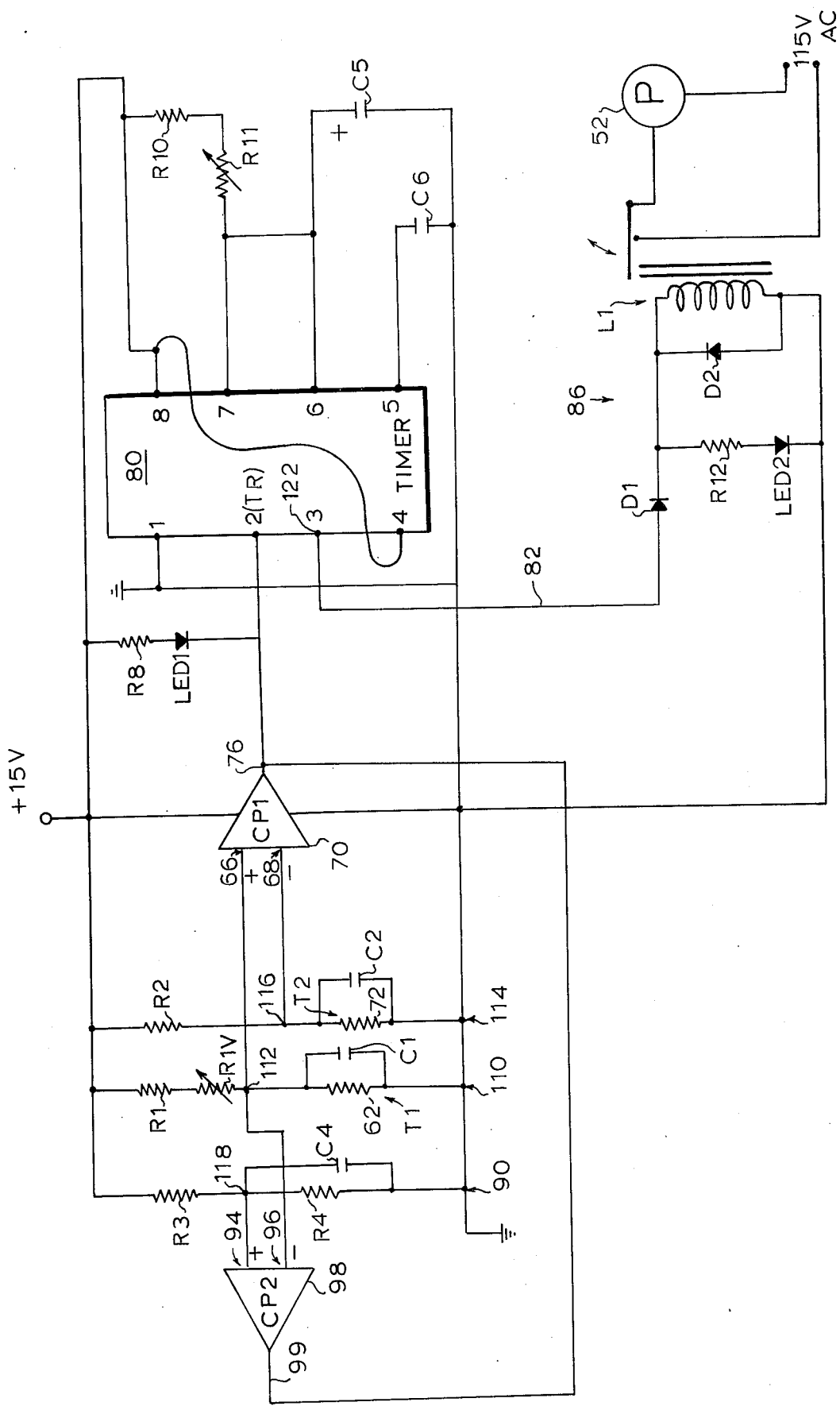
FIG. 2 is a circuit diagram for the differential amplifier control system for the solar heater.

With reference to FIG. 2, the first thermistor (T1) 62 together with a first reference resistor R1 and a first variable reference resistor R1V form a first leg 110 of a bridge circuit. A first sampling point 112 is included at the junction between the first variable reference resistor R1V and the first thermistor 62. If a variable temperature function is not desired, then the variable resistor R1V may be omitted. The second thermistor (T2) 72 together with a second reference resistor R2 comprises a second leg 114 of the bridge circuit. A second sampling point 116 is located between the series connected second reference resistor R2 and the second thermistor 72. A third leg 90 of the bridge circuit includes a third reference resistor R3 in series with a fourth reference resistor R4, with a third sampling point 118 included at the intersection thereof. The first thermistor 62 is bypassed by a first bypass capacitor C1, the second thermistor 72 is bypassed by a second bypass capacitor C2, and the fourth reference resistor R4 is bypassed by a fourth bypass capacitor C4. The first and second thermistors 62 and 72 have a nominal 5 k. ohm value at a nominal 25° C. Both first and second thermistors 62 and 72 have a known precision resistance over a temperature variation of 0° to 100° C. and have a negative temperature coefficient.

The first sampling point 112 is coupled to the plus input 66 of the first differential comparator 70. Likewise, the second sampling point 116 is coupled to the minus input 68 of the first comparator 70. The first comparator 70 may comprise a LM 311 voltage comparator, for example. When the voltage at the plus input 66 of the first comparator 70 is less than the voltage at the minus input 68 thereof, the output 76 is in a low state or zero volts. When the voltage at the plus input 66 of the first comparator 70 is greater than the voltage at the minus input 68 thereof, the output 76 of the first comparator is a positive voltage thereon (the off signal).

The operation of the first comparator 70 will now be explained with reference to FIG. 2. As the first thermistor 62 is warmed by the heat contained by the water within the solar heating collector 14, its resistance decreases. Therefore, in the first leg 110 of the bridge circuit the voltage across the first thermistor 62 will decrease. Similarly, the water within the bottom section of the first storage tank 26 will be of a cooler temperature than the water within the solar heating collector 14, and therefore the resistance of the second thermistor 72 will be greater than the resistance across the first thermistor 62. Consequently, the voltage across the second thermistor 72 will be greater than the voltage across the first thermistor 62 thus causing the voltage at the negative input 68 of the first comparator 70 to be greater than the voltage at the positive input 66. This causes the first comparator to have a zero voltage (low) on the output 76 thereof (run signal). LED1 is on when the output of either comparator is low, indicating an on state of one of the comparators. The resistor R8 limits the current in the LED1.

When the temperature of the first thermistor 62 and the second thermistor 72 are exactly equal it is desirable that the first comparator output 76 be low. For this purpose the second reference resistor R2 is selected to have a larger resistance value than the first reference resistor R1. The difference between the ohmic values of the first reference resistor R1 and the second reference resistor R2 will determine the temperature differential (or predetermined level) by which the temperature of the first thermistor 62 must exceed the temperature of the second thermistor 72 before the first comparator 70 will have a low output. For example, if the resistance offset between R1 and R2 is 5100 ohms, the temperature offset will range from 2.35° C. to 4.11° C. as the temperature varies over the range of 0° to 100° C. Likewise, for an offset of 4000 ohms, the offset temperature may range from 1.87° C. to 3.26° C. over the same temperature range.

Summarizing now the operation of the first comparator 70, when the temperature of the first thermistor 62 is greater than the temperature of the second thermistor 72 plus the predetermined offset level, the output 76 of the first comparator 70 will be low. When the temperature of the first thermistor 62 is less than the temperature of the second thermistor plus the predetermined temperature offset, the output 76 of the first comparator 70 will be high.

Returning now to the bridge circuit, the third leg 90 comprises a voltage divider between the reference resistors R3 and R4. The third sampling point 118 is coupled to a positive input 94 of the second comparator 98, thus presenting a reference voltage input which is independent of temperature. A minus input 96 of the second comparator 98 is coupled to the first sampling point 112 of the first leg 110 of the bridge circuit. As a design parameter the value of the third reference resistor R3 will be chosen equal to the value of the first reference resistor R1. Likewise, the value of the fourth reference resistor R4 will be chosen equal to the nominal value of the resistance of the first thermistor 62 at a temperature of 2° C. As the temperature of the first thermistor 62 decreases its resistance will increase, and therfore the voltage at the first sampling point 112 will increase. At the critical temperature the voltage at the first sampling point 112 will be equal to the voltage at the third sampling point 118 and the output 99 of the second comparator 98 will change from its normal high output voltage to a low output voltage. At 2° C. the resistance of the first thermistor T1 will be approximately 14,700 ohms. Therefore, the fourth reference resistor R4 should be 14,700 ohms for allowing the output voltage 99 of the second comparator 98 to drop low at approximately 2° C.

The timer or timing means 80 provides a delay or hysteresis effect so that the run signal from either the first or second comparator 70 or 98 will be present long enough to prevent the circulating pump 52 from chattering on and off (due to small temperature fluctuations from passing clouds or due to temporary instability of the high gain comparators). When the trigger input TR of the timer 80 receives a negative going or low signal, the output 122 of the timer will go to a high output voltage. The transition of the output 122 to the high condition initiates the timing sequence. If the trigger input TR stays low for a length of time longer than a preset minimum time period, the output 122 will stay high. However, if the input voltage at the trigger input 120 stays low for a period of time shorter than the predetermined minimum time period, the output 122 will remain high for the duration of the predetermined minimum time period before transitioning to the low output level. The duration of the predetermined minimum time period generally corresponds to the length of time required for the circulating pump 52 to transfer all of the hot water from the solar heating collector 14 into the first storage tank 26. The predetermined minimum time period is determined by the values of resistor R10 and R11 and a capacitor C5 according to the formula minimum time period in seconds is equal to 1.1 times R times C. A predetermined minimum time period of approximately 1 minute is optimum under normal circumstances. A typical device which may be used for the timer 80 is the NE 555 integrated circuit.

The output 122 of the timer 80 is coupled by the control line 82 to an actuating circuit 86. The actuating circuit 86 (or actuating means) includes a first diode D1 in series with the control line 82 to protect the timer integrated circuit 80 from any voltage spikes generated by relay coil L1. A diode D2, connected in parallel with the relay coil L1, provides an alternate path for the current in the coil L1 to discharge through. A second light emitting diode LED2 is coupled in parallel with the relay coil L1 to show the activation thereof. A current limiting resistor R12 is connected in series with the light emitting diode LED2. Supplying power to the relay coil L1 from timer output 122 will close the relay and therefore apply power to the circulating pump 52.

The operation of the control system for the solar heater will now be recapped with reference to FIGS. 1 and 2. The water 16 within the solar heating collector 14 will be heated by solar radiation. The temperature of the water 16 therein will be sensed by the first temperature sensing means 62 which is the first thermistor T1. The temperature of the cooler water 16 within the first storage tank 26 will be sensed by the second temperature sensing means 72 or the second thermistor T2. When the temperature of the first thermistor 62 (or T1) is greater than the temperature of the second thermistor 72 (or T2) plus the predetermined offset level (determined by R1 and R2 as previously described) the output voltage 76 of the first comparator 70 will drop low. Otherwise the output voltage 76 of the first comparator 70 will remain high. When the low output voltage 76 from the first comparator 70 is coupled to the input of the timer 80, the output of the timer 80 will go high, thus energizing the relay coil L1 of the actuator 86. The closing of the relay responsive to the voltage across the relay coil L1 will supply power to the circulating pump 52, thereby pumping the hot water from the solar heating collector 14 through the hot water pipe 22 and into the first storage tank 26. Of course, a portion of the cold water 16 within the first storage tank 26 will be recirculated through the cool water return lines 50 and 54 by the circulating pump 52.

If the output 76 of the first comparator 70 goes low only temporarily, the output 122 of the timer 80 will remain high for a minimum period of time determined by the values of resistors R10 and R11 and capacitor C5. When hot water 16 is demanded from the main hot water output 60, hot water within the first storage tank 16 will be drawn from the first storage tank 26 through the hot water output pipe 32 into the second storage tank 36.

The auxiliary heating unit 38 within the second storage tank 36 may be utilized to heat the water 16 therein on days when sufficient solar heating is not available.

Under cold weather conditions, or under periods of low solar heating, the temperature of the water 16 within the solar heating collector 14 may approach the freezing level. Under these conditions, the temperature of the first thermistor 62 (or T1) will be compared to a reference standard 90 by the operation of the second comparator 98. When the voltage across the first thermistor 62, which is coupled from the first sampling point 112 to the minus input 96 of the second comparator 98, goes more positive than the positive voltage from the reference standard 90, the output 99 of the secomd comparator 98 will drop from the normal high voltage to a low voltage output designating the approach of a freezing condition. The output 99 of the second comparator 98 is coupled to the input of the timer in a manner similar to the output 76 of the first comparator 70. Thus, as the temperature of the water 16 within the solar heating collector 14 approaches within several degrees of the freezing level, the output 99 of the second comparator will actuate the timer 80 thereby energizing the relay coil L1 and closing the relay to power the circulating pump 52. Therefore, the circulating pump 52 will pump the warmer water 16 within the first storage tank 26 into the solar heating collector 14, and the cooler water from the solar heating collector 14 into the first storage tank 26. This method of circulating the cold water will be sufficient to prevent freezing for short durations of cold weather. However, longer durations of cold weather will require the water within the solar heating collector 14 to be drained to prevent the freezing thereof. In the alternative, the heater 38 can be used to heat the water which is then circulated.

It will of course be understood that different components can be utilized without departing from the scope of the invention and that the following list is not to be construed as limiting but only as an example.

| COMPONENTS LISTING | |
|---|---|
| CP1 | LM311 |
| CP2 | LM311 |
| T1 | YSI precission thermistor No. 44034   5000 ohms |
| T2 | at 25 C. ± .1 C. interchangeability or equivalent |
| Timer | NE555 |
| LED1 | TIL 210 |
| LED2 | TIL 210 |
| L1 | Relay |
| D1 | 100 volts  1 amp. |
| D2 | 100 volts  1 amp |
| R1 | 40,200 k   ¼ watt 1% R2 |
| R2 | 45,300   ¼ watt 1% |
| R3 | 40,200   ¼ watt 1% |
| R4 | 14,700   ¼ watt 1% |
| R8 | 680 ohms   ¼ watt 10% |
| R10 | 330 ohms   ¼ watt 10% |
| R11 | 2.5 meg. pot   10% |
| R12 | 680 ohms   ¼ watt 10% |
| C1 | .1 µf 50 volts |
| C2 | .1 µf 50 volts |
| C4 | .1 µf 50 volts |
| C5 | 50 µf 25 volts |
| C6 | .1 µf 50 volts |

It will be clear at this point that a control system for a solar heater has been provided which overcomes some of the problems of prior solar heating control systems. However, the invention is not to be construed as limited to the particular forms disclosed herein since these embodiments are to be regarded as illustrative rather than restrictive.

I claim:
1. A system for controlling the flow of a liquid through a solar heating system of the type having the output of a solar energy collector coupled to the input of a storage tank and having a circulating pump interposed along a return liquid pipe coupled between the recirculating output of the storage tank and the input of the solar energy collector, the control system comprising in combination:
   first temperature means for sensing the temperature of said liquid adjacent said output of said solar energy collector, said first temperature means generating a first signal responsive thereto;
   second temperature means or sensing the temperature of said liquid at a second location within said solar heating system, said second temperature means generating a second signal responsive thereto;
   first comparator means, coupled between said first and second temperature means, for generating a run signal responsive to the difference between said first and second signals exceeding a predetermined level;
   actuating means for powering said circulating pump responsive to said run signal, whereby said liquid is circulated within said solar heating system; and
   timing means interposed between said first comparator means and said actuating means, said timing means for passing said run signal therethrough and for sustaining said run signal therethrough for a minimum time period if the duration of said run signal should be less than said minimum time period, whereby said circulation pump when activated will be powered for at least said minimum time period.

2. A control system as described in claim 1 wherein said second location is adjacent to said recirculating output of said storage tank.

3. A control system as described in claim 2 wherein said second location is adjacent to the bottom of said storage tank.

4. A control system as described in claim 1 including means for varying said minimum period of time over the range of 30 seconds to 2 minutes.

5. A control system as described in claim 1 wherein said first temperature means comprises a first thermistor coupled through said solar energy collector adjacent said output thereof.

6. A control system as described in claim 5 wherein said second temperature means comprises a second thermistor coupled through said storage tank adjacent said recirculating output thereof.

7. A control system as described in claim 6 wherein said first and second thermistors have similar temperature coefficients.

8. A control system as described in claim 6 wherein said first comparator means comprises:
   a bridge circuit having in a first leg thereof said first thermistor and a first reference element with a first sampling point therebetween, and having in a second leg thereof said second thermistor and a second reference element with a second sampling point therebetween; and
   first differential comparator circuit means having inputs thereto coupled between said first and second sampling points of said bridge circuit for generating said run signal responsive to said difference between said first and second signals exceeding said predetermined level.

9. A control system as described in claim 8 including means for varying said predetermined level.

10. A control system as described in claim 8 including freeze protection means for circulating said liquid within said solar heating system when the temperature of said liquid in said solar energy collector drops below a predetermined temperature.

11. A control system as described in claim 10 wherein said freeze protection means comprises:
   third temperature means for sensing the temperature of said liquid in said solar energy collector, said third temperature means generating a third signal responsive thereto;
   a reference standard for generating a reference signal; and
   second comparator means, coupled between said reference standard and said third temperature means, for transmitting another run signal to said actuating means responsive to the difference between said third signal and reference signal exceeding another predetermined level.

12. A control system as described in claim 11 wherein said third temperature means comprises said first thermistor.

13. A control system as described in claim 12 wherein said second comparator means includes:
   a third leg in said bridge circuit having said reference standard therein, said reference standard comprising a third reference element and a fourth reference element with a third sampling point therebetween; and
   a second differential comparator circuit means having inputs coupled between said first and said third sampling points of said bridge circuit for generating said run signal when said difference between said first signal and said reference signal exceeds another predetermined level.

14. A system for controlling the flow of a liquid through a solar heating system of the type having the output of a solar energy collector coupled to the input of a storage tank, a return liquid line, and a circulating pump for moving the liquid through the solar energy collector to the storage tank, the control system comprising in combination:
   first temperature means for sensing the temperature of said liquid within said solar energy collector and generating a first signal representative thereof;
   second temperature means for sensing the temperature of said liquid within the storage tank and for generating a second signal representative thereof;
   first comparator means, coupled between said first and second temperature means, for generating a run signal responsive to the difference between said first and second signals exceeding a predetermined level;
   actuating means for powering said circulating pump responsive to said run signal, thereby circulating said liquid within said solar heating system;
   third temperature means for sensing the temperature of said liquid in said solar energy collector and for generating a third signal representative thereof;
   a reference standard for generating a reference signal representative of a critical temperature; and
   second comparator means, coupled between said reference standard and said third temperature means, said second comparator means for transmitting another run signal to said actuating means responsive to said third signal being less than said reference signal by another predetermined amount, whereby said liquid within said solar heating system will be circulated when the temperature of said liquid in said solar energy collector drops below said critical temperature.

15. The control system as described in claim 14 further including timing means interposed between said first comparator means and said actuating means said timing means for passing said run signal therethrough and for sustaining said run signal therethrough for a minimum time period responsive to the duration of said run signal being less than said minimum time period whereby said circulation pump when activated will be powered for at least said minimum time period.

16. The control system as described in claim 15 wherein said first comparator means comprises:
   a bridge circuit having in a first leg thereof a first thermistor and a first reference element with a first sampling point therebetween, and having in a second leg thereof a second thermistor and a second reference element with a second sampling point therebetween; and
   first differential comparator circuit means having inputs thereto coupled between said first and second sampling points of said bridge circuit said first differential comparator circuit means for generating said run signal responsive to said difference between said first and second signals exceeding said predetermined level.

17. The control system as described in claim 16 wherein said reference standard comprises:
   a third leg of said bridge circuit comprising a third reference element and a fourth reference element with a third sampling point therebetween; and
   a second differential comparator circuit means having inputs coupled between said first and said third sampling points of said bridge circuit for generating said run signal responsive to said difference between said first signal and said reference signal exceeding another predetermined level.

* * * * *